United States Patent [19]

Nepple et al.

[11] Patent Number: 5,185,604
[45] Date of Patent: Feb. 9, 1993

[54] MESSAGE INDICATING ICON MECHANISM

[75] Inventors: Bruce C. Nepple, Portland; Garold B. Gaskill, Tualatin; Danial J. Park, Aloha, all of Oreg.

[73] Assignee: Seiko Corp. and Seiko Epson Corp., Japan

[21] Appl. No.: 538,022

[22] Filed: Jun. 13, 1990

Related U.S. Application Data

[63] Continuation-in-part of Ser. No. 435,315, Nov. 13, 1989, abandoned, which is a continuation-in-part of Ser. No. 352,635, May 12, 1989, Pat. No. 4,897,835, which is a continuation of Ser. No. 121,139, Nov. 16, 1987, abandoned, which is a continuation-in-part of Ser. No. 802,844, Nov. 27, 1985, Pat. No. 4,713,808.

[51] Int. Cl.⁵ .............................................. H04Q 7/00
[52] U.S. Cl. .................................. 340/825.44; 371/32; 371/33; 279/63
[58] Field of Search ............ 340/525.44, 825.34, 340/32.1, 38.1, 38.4; 455/32, 38; 379/57, 63; 371/32, 33

[56] References Cited

U.S. PATENT DOCUMENTS

| 4,385,295 | 5/1983 | Willard et al. | 340/825.44 |
| 4,422,171 | 12/1983 | Wortley et al. | 371/32 |
| 4,477,807 | 10/1984 | Nakajima | 340/825.44 |
| 4,626,842 | 12/1986 | Ichikawa et al. | 340/825.44 |
| 4,682,165 | 7/1987 | Davis | 340/825.44 |
| 4,698,805 | 10/1987 | Sasata et al. | 455/17 |
| 4,713,808 | 12/1987 | Gaskill | 340/825.44 |
| 4,759,022 | 7/1988 | Aterberg | 371/5.1 |

Primary Examiner—Donald J. Yusko
Assistant Examiner—Peter Weissman
Attorney, Agent, or Firm—Elmer Galbi

[57] ABSTRACT

A paging system where messages are numbered before they are transmitted. The paging receivers in the system compare both the number and the text information in each message which is received to the message number and the text information in the most recently received previous message. The comparison is used to determine if the same message was previously received and if the any messages were missed. The receiver includes an icon which is turned on to indicate if a message has been received. The icon is set to a blinking state if a message is received and if there is a break is the sequence of message numbers indicating that a message has been missed.

12 Claims, 4 Drawing Sheets

MESSAGE INDICATING ICON MECHANISM

RELATED APPLICATIONS

The present application is a continuation in part of application Ser. No. 07/435,315, filed Nov. 13, 1989 for PAGING SYSTEM WITH MESSAGE NUMBERING PRIOR TO TRANSMISSION and now abandoned; which is a continuation-in-part of application Ser. No. 07/352,635, filed May 12, 1989, which issued Jun. 30, 1990 as U.S. Pat. No. 4,897,835, which is continuation of abandoned application Ser. No. 07/121,139 filed Nov. 16, 1987, which was a continuation-in-part of application Ser. No. 06/802,844, filed Nov. 27, 1985, for WATCH PAGER SYSTEM AND COMMUNICATION PROTOCOL, now U.S. Pat. No. 4,713,808, granted Dec. 15, 1987. Another related case is co-pending application Ser. No. 381,442, filed Jul. 18, 1989, for PAGING MESSAGE INTERFACE AND MISSED MESSAGE RETRIEVAL METHOD and now abandoned. All of these related cases are assigned to the present assignee and are incorporated herein by reference.

FIELD OF THE INVENTION

The present invention relates to paging systems, and more particularly to a paging system receiver wherein each message received is coded with a unique message number, which alerts a receiver user to the presence or absence of a message which is intended for the user.

BACKGROUND OF THE INVENTION

In conventional paging systems, each paging receiver is assigned a unique address. Whenever a paging message is transmitted, the system transmits the message in associate with the address of a particular paging receiver for which the message is intended. Each paging receiver in the system only accepts messages which include its address.

It is desirable that paging receivers provide very high reliability; however, environmental factors sometimes interfere with message reception and sometimes messages are lost. It has been suggested that it would be desireable if each message were numbered so that a user of a receiver could determine if a message had been missed. This is suggested in a report by the Post Office Code Standardization Advisory Group (POCSAG) entitled "Standard Message Formats for Digital Radio Paging", Autumn 1980. Message numbering was not made apart of the POCSAG standard which is discussed in the subject report. The group which prepared the report merely indicated that "message or segment numbering is recommended as a feature for paging system operators to offer as useful option". The authors indicated that numbers in "the cyclically rotating range 1-9 would be sufficient". There is no indication that the authors conceived a practical implementation for the suggested system.

Some prior art paging receivers which use the POCSAG protocol described in the above reference, do provide facilities for numbering messages. For example, U.S. Pat. Nos. 4,385,295, 4,412,217 and 4,803,487 provide systems which number messages. However, these receivers include memory mechanisms for storing messages and assigning each incoming message with a message number. The incoming message and the associated number are then stored in the receiver's memory. When the message is later retrieved for viewing, the message numbers also displayed, thereby aiding a pager user, or subscriber to the paging system, in keeping track of which messages have been reviewed.

U.S. Pat. No. 4,803,487 describes a different system which uses message numbering. In the systems shown in that reference, the display portion of the pager unit is separated from the receiver portion. The display portion is worn on the subscribers wrist, while the receiver portion is carried elsewhere on the subscribers person, apparently because the receiver is of two large a size to be comfortably worn on the receivers wrist. The receiver portion of this system includes message memory and includes a low powered transmitter for relaying the messages from the receiver portion to the display portion for display to the subscriber. The receiver assigns numbers as messages are received and provides the number information to the display along with the message.

The attachment of a number to a message at the receiver does nothing to alert the subscriber to the absence of a message if the message has not reached the subscriber. Nor does assigning a message number at the receiver provide any information which enables the receiver to determine if a message has been missed.

Unlike the prior art described above, in which the message numbers are assigned on receipt of the message, the transmitting system which is used with the present invention assigns the numbers to messages at origination, at the system's central clearing house facility. This message assignation system is described in co-pending Ser. No. 435,315, filed Nov. 13, 1989 to Gaskill et al.

The system described in the above-referenced, co-pending applications achieves a high degree of reliability by transmitting each message several times. In such a system, message numbering is used in a novel way to achieve synergistic results with the other parts of the system.

SUMMARY OF THE INVENTION

An object of the invention is to provide an icon mechanism and a method of alerting a paging system subscriber to the presence or absence of a message which is a part of a sequence of messages.

Another object of the invention is to provide an icon mechanism and method which allows a paging system subscriber to recapture missed messages.

A further object of the invention is to provide an icon mechanism and method which provides a storage buffer for received messages.

Still another object of the invention is to provide an icon mechanism and method which provides a comparison mechanism for comparing newly received messages to previously received messages to eliminate the storage of duplicative messages.

Another object of the invention is to provide an icon mechanism and method which allows a subscriber to a paging system to acknowledge and receive the messages, thereby clearing the icon mechanism.

The present invention is used in a system such as that described in the referenced copending applications wherein a sequential, unique message number, is assigned to each paging message at the time of transmission and this number is detected by the receiver as described in the referenced patent applications. Message numbers are used for two purposes; first, the message number is used to signal a receiver that it should ignore a message if it previously received a message with the same message number. This is a necessary feature because in order to enhance reliability, the transmitting system routinely transmits each message several times. Second, because the message number which is received with a message is stored and displayed with the message, missing messages may be readily detected by reviewing stored messages and looking for missing numbers.

With the present invention, when a message is received, an icon, having a first set of characteristics is displayed to the subscriber. In the event that the receiver detects a break in the sequence of message numbers, the same icon is displayed having a different set of characteristics. The subscriber may then telephone the clearing house facility and request that the missed message(s) be retransmitted.

The message indicating icon mechanism of the invention includes a message signal generating mechanism for generating a message-received signal upon receipt of a message signal, a message storage buffer for storing received data streams, an interrogation mechanism for comparing sequentially received message numbers and generating a missing message signal if the message numbers are not sequential, and an icon generating mechanism for indicating a message condition wherein the icon mechanism displays icons of different form depending on the condition of received messages. The mechanism further includes a non-duplicating structure which compares a message number with a previously received message number, stored in the buffer, and compares the newly received message text with the stored message text associated with the previously received message number, and discards the newly received data stream if both the message number and the message text are identical.

The method of the invention alerts a user of a message-receiving device to the presence or absence of a particular message, wherein each received message includes unique message number data. The method includes the steps of determining a unique message number for the received message number data, comparing the received message number against previously received and stored message numbers, determining the position of the received message number relative to previously received and stored message numbers, displaying an icon of first characteristics if and only if the received message is the last in a sequential string of received and stored messages, and displaying an icon of second characteristics if and only if the received message number follows a break in a sequential string of received and stored message numbers.

These and other objects and advantages of the invention will become more fully apparent as the description which follows is read in conjunction with the drawing.

DETAILED DESCRIPTION OF THE PREFERRED EMBODIMENT

The present invention is intended for use in conjunction with a paging system, such as the "Gaskill" system described in U.S. Pat. No. 4,713,808 and in allowed application Ser. No. 07/352,635. It operates in conjunction with the PAGING SYSTEM WITH MESSAGE NUMBERING PRIOR TO TRANSMISSION system described in co-pending application Ser. No. 435,315 to Gaskill et al., filed Nov. 13, 1989, and with the system described in Ser. No. 381,442, filed Jul. 18, 1989 for PAGING MESSAGE INTERFACE AND MISSED MESSAGE RETRIEVAL METHOD. The present invention was conceived prior to the filing dates of the aforementioned commonly owned applications, which are cited solely to provide background for the invention disclosed herein. It should be recognized that the present invention goes beyond the disclosures in the above-identified patent and applications, which are incorporated herein by reference.

The Gaskill system includes a clearing house which receives messages from people wishing to reach a subscriber to the paging system. Broadcast facilities are provided which transmit a message signal, having a data stream representing a message wherein each such data stream includes message data, representing message text, and message number data, identify the message by a unique message number.

The clearing house and broadcast facilities are collectively referred to herein as a message sending system. The clearing houses are fully automated, centralized facilities which accept messages, validate subscriber identification, determine message destinations, and route messages to an appropriate broadcast facility for transmission. Callers to the system dial a local clearing house telephone number and receive voice prompts that guide them through a simple process for sending messages.

The broadcast facilities are typically conventional FM broadcast stations that carry paging data on subcarriers of their signals. Multiple stations may be used for transmission in any given area. Diversity of signals, along with repeated transmissions, improve system reliability. Because messages are transmitted several times on each station and each message may also be transmitted over several different stations, it is essential that a receiver have a means of identifying whether the same message has been previously received. The message number which is transmitted as part of the data stream, provides a mechanism for detecting missed and duplicate messages.

Figure 1:
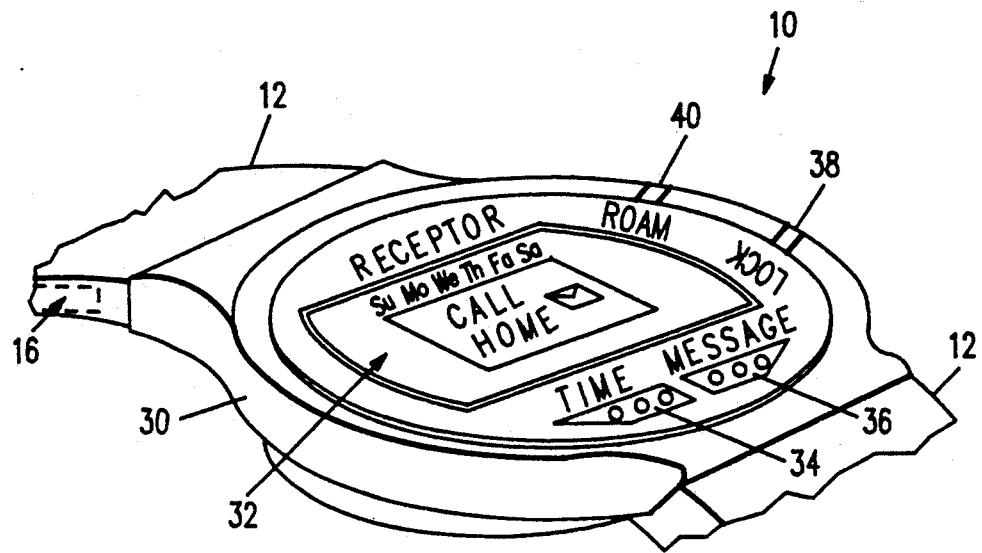
FIG. 1 is a perspective view of a wrist watch message receiver of the invention, having a message and a message icon displayed thereon.

Turning now to the drawings, and initially to FIG. 1, a wrist watch paging receiver constructed according to the invention is depicted generally at 10. Wrist watch 10 includes a wrist band, shown in fragment at 12. Watch 10 includes a receiver 14 therein, which receives messages and also provides conventional day/date/time data. An antenna 16 is connected to receiver 14 and is carried in band 12. The actual mechanism and workings of wrist watch 10 are fully described in the previously identified patents and co-pending applications.

Figure 3:
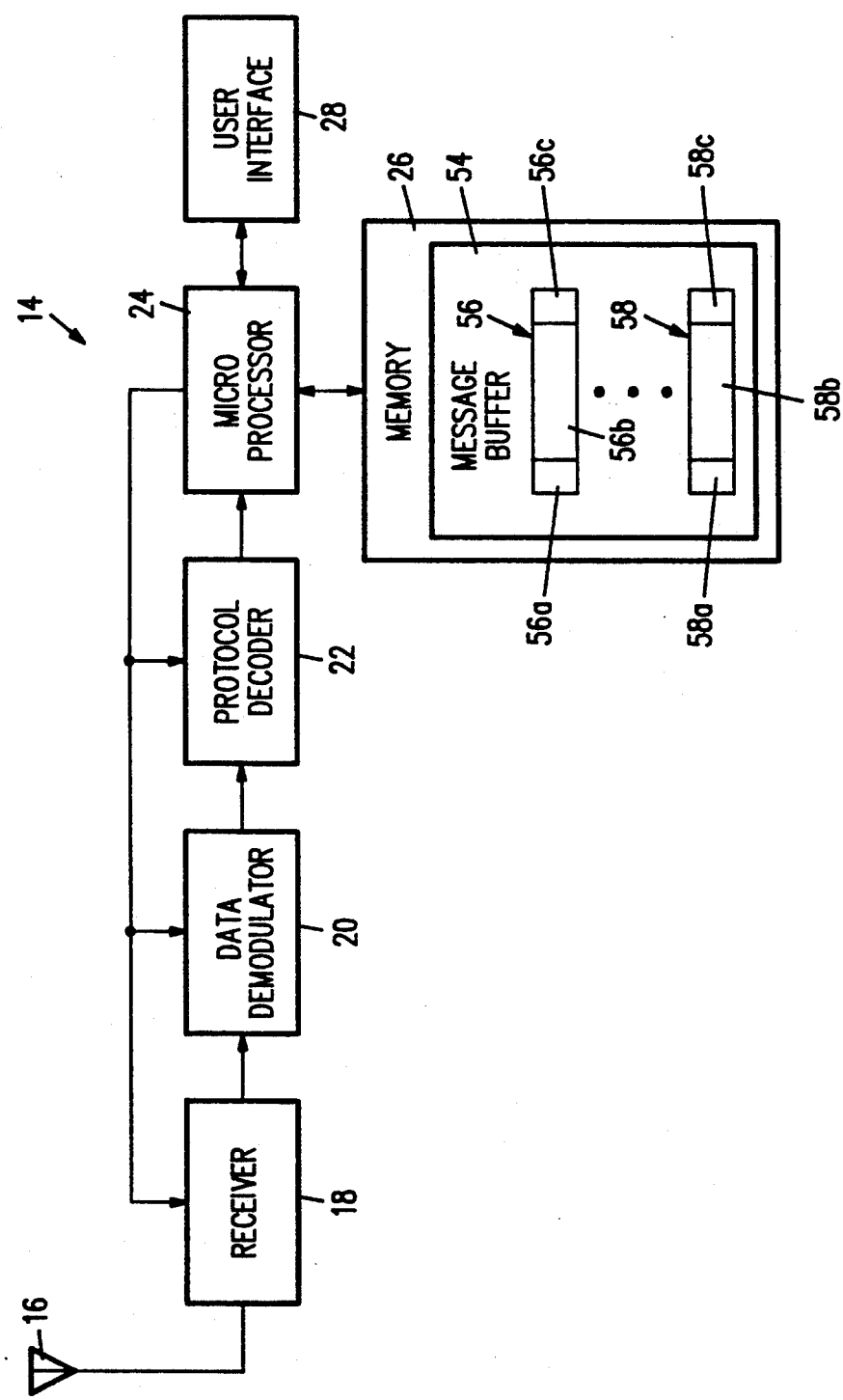
FIG. 3 is a block diagram of the receiver mechanism of the wrist watch paging receiver.

Referring now to FIG. 3, a block diagram of the receiver mechanism contained in wrist watch paging wrist watch 10 is depicted generally at 14, the receiver includes an antenna 16, a frequency agile receiver 18, a data demodulator 20, a protocol decoder 22, a microprocessor 24, with associated memory 26, and a user interface 28.

Memory 26 is provided with various data and programs which relate to operation of wrist watch 10, such as a subroutine for finding a new station, a subroutine for obtaining a local channel list, a subroutine for detecting missing messages, a datum indicative of the frequency to which the watch is presently tuned and local channel list. Referring once again to FIG. 1, the mechanical feature of wrist watch 1 will be described.

Wrist watch 10 includes a housing 30 which encloses the receiver mechanism and power supply, a display screen 32, which displays time and message information, a time button 34, a message button 36, a lock button 38 and a roam button 40. Screen 32 and buttons 34, 36, 38 and 40 comprise what is referred to herein as user interface 28.

The terms acknowledged message and unacknowledged message are herein used to indicate whether or not the operator has in fact taken a specific action to indicate that he has recognized the existence of a message. A more specific definition of these terms is given below. When a message is received the time display disappears and the message appears. If time button 34 is pressed when a message is being displayed, the display will switch back to showing the time. This operation does not constitute acknowledgement of a message. If when a message is displayed the operator presses message button 36 the display will show the message number and the time that the message was received. It is this operation that constitutes acknowledging a message.

A variety of displays can be presented on display screen 32. As depicted in FIG. 1, a CALL HOME message is displayed along with an envelope icon 42. The presence of icon 42 in a steady state display indicates that an unacknowledged message exists in the message buffer. If icon 42 is flashing, i.e., in an alternating off-and-on state, it indicates that an unacknowledged message has a missing predecessor message, that is, a message number in the sequence of messages has been missed, or that an unacknowledged message has been deleted from the receiver's memory as will be explained later. The message indicating icon mechanism which produces icon 42 will now be described in greater detail.

As previously noted, wrist watch 10 is par of a message receiving system, which receives messages from a message sending system. The sending system transmits a message signal which includes a data stream. The data stream represents a message. Each data stream includes message data, representing the message text, and message number data, identifying the message by a unique message number, which is assigned to the message at the clearing house.

Figure 4:
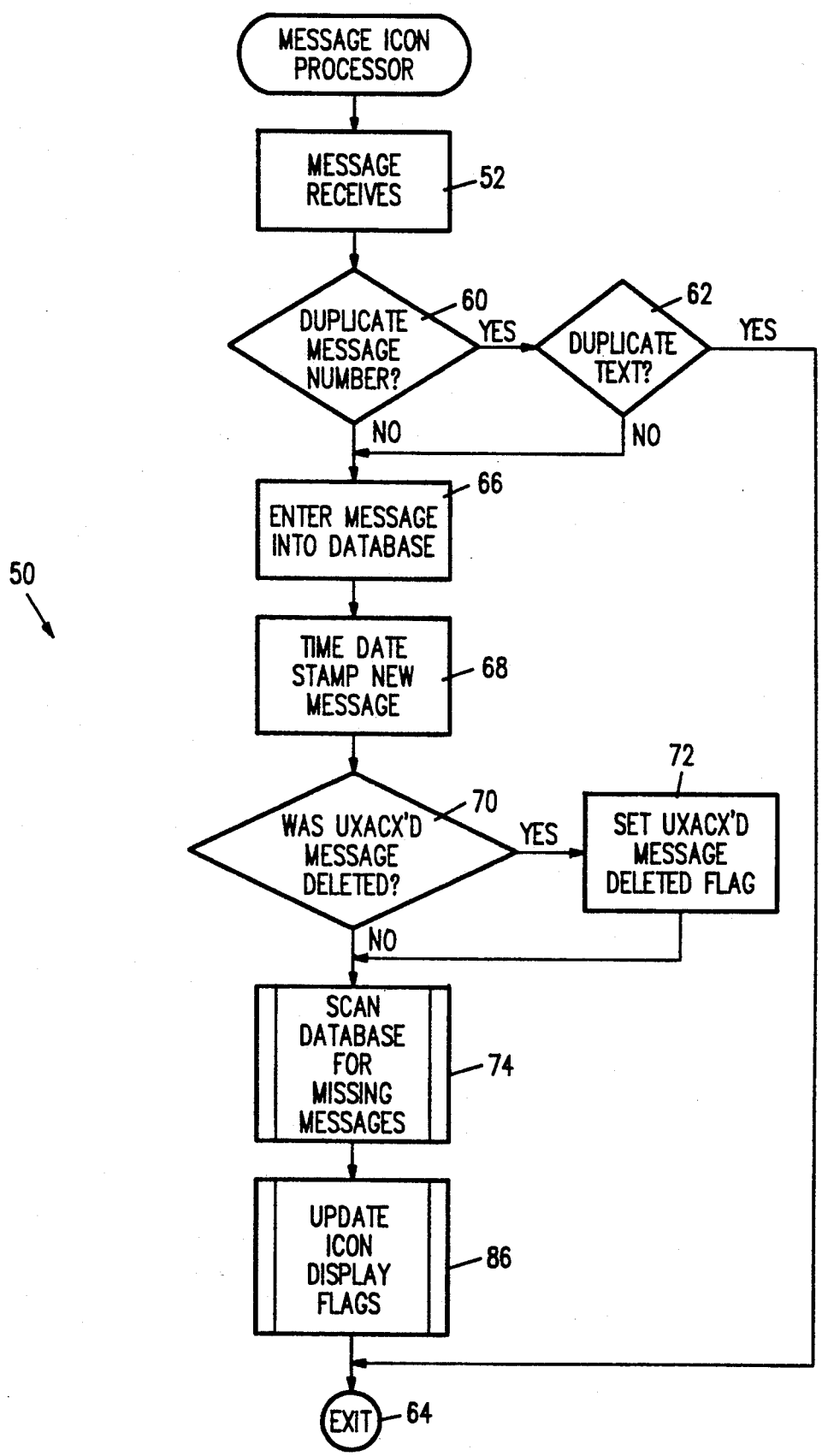
FIGS. 4-4b diagrams depicting the sequence of events to operate the message indicating icon mechanism of the invention.

Referring now to FIG. 4, the message indicating icon mechanism of the invention is depicted in block form generally at 50.

Mechanism 50 is contained in memory 26 and is called upon by microprocessor 24 to analyze a newly received message and generate the appropriate icon 42, depending upon the message received and the sequential nature of the message.

Upon receipt of a message by wrist watch 10, and following data demodulation 20 and protocol decoding 22, the message is received by microprocessor 24, block 52, which functions as a message signal generating means and generates a message-received signal. The data stream is decoded and the message text and message number are determined from the received data stream by microprocessor 24. The message number data is compared against message number data previously received and stored in a message buffer, or message storage means 54, which is a part of memory 26. In the preferred embodiment, message buffer 54 is allotted sufficient space to store eight messages. For simplicity sake, only a first message buffer storage register 56 and a last message storage register 58 are depicted. Obviously, more or less memory may be allotted to message storage, depending upon the available memory size. Each storage register is divided into a message number data area, such as area 56a, a message text area, such as area 56b, and a time/date stamp area, such as area 56c.

As a new message comes in and is retained in microprocessor 24, the message number associated therewith is compared to the message numbers contained in buffer 54, block 60. In the event that a duplicate number is found, the newly received text in microprocessor 24 is compared with that stored for the associated message number contained in buffer 54, block 62. If both the message number and the text are duplicates, the routine is exited, block 64, and no further action is taken. The instruction set for accomplishing the foregoing is referred to herein as message non-duplicating means.

In the event that either or both the message numbers or text are not duplicates, the message is entered into an appropriate storage register in buffer 54, block 66. As the message is entered into the data base, its time and date of reception which is stored in another part of the message storage area, such as 56c, as represented by block 68.

In the protocol of the present invention, messages which are transmitted from the clearing house over the broadcast facility are provided with unique message numbers which range from $\emptyset$ to 31. The selection, in the preferred embodiment, of the 32 number, $\emptyset$-31, range is a function of binary numbering, in that 5 bits of the data stream are provided for message numbering. Once message number "31" has been assigned to a message, the clearing house mechanism begins renumbering at "$\emptyset$".

As has been previously noted, in the preferred embodiment of wrist watch 10, there is room for approximately 8 messages, and therefore, it is apparent that not all messages in a 32 message sequence may be stored at one time in memory 26. In the event that the message buffer fills up, and additional messages are received, the earliest received message, which is most likely occupying last message storage register 58, is deleted, the remaining messages moved down in the message buffer, and the new message stored in the first message storage area. In the event that an unacknowledged message is deleted, block 70, a deleted message flag is set, block 72. In the preferred embodiment, a unacknowledged message deleted flag results in icon 42 being displayed in an alternating off-and-on, or blinking, state.

Figure 4A:
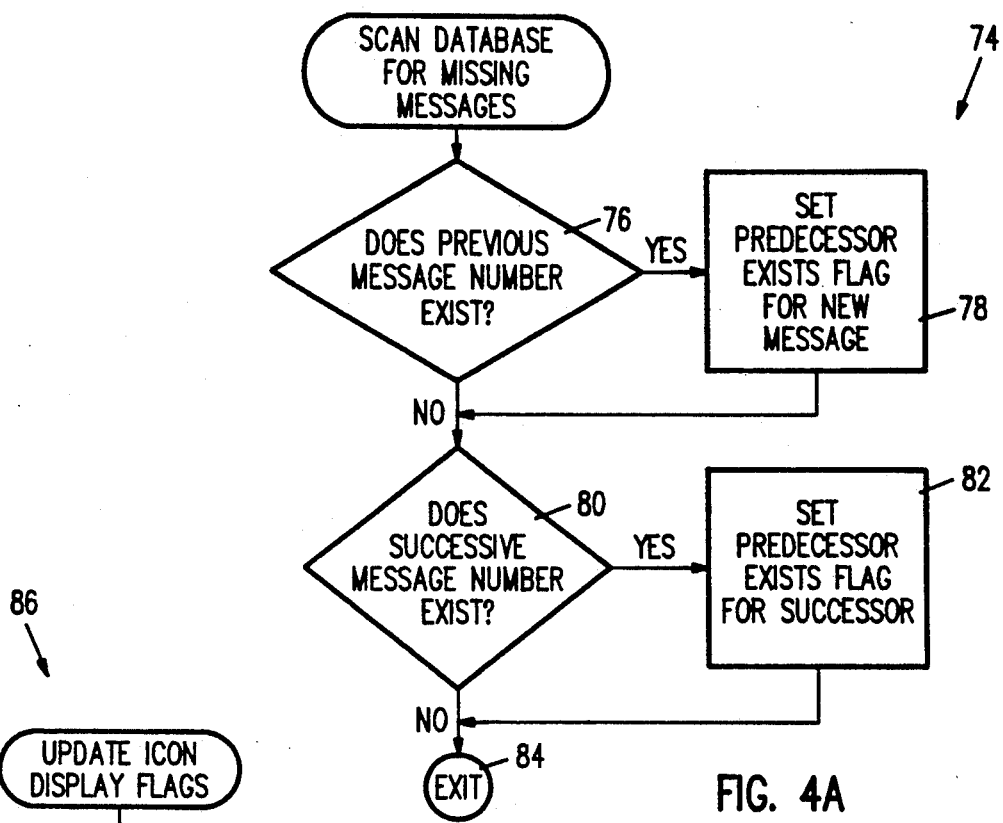

The next step in mechanism 50 requires microprocessor 24 to scan the database, i.e., message buffer 54, for missing messages, block 74, using what is referred to herein as interrogation means for comparing sequentially received message numbers and generating a missing message signal if the message numbers are not sequential. This subroutine is depicted in FIG. 4a. Initially, and with microprocessor 24 having the newly received message number retained therein, buffer 54 is scanned for the previous message number, block 76. If the previous message number does exist, the subroutine executes block 78 and sets the "predecessor exists" flag for the new message. Next, the message buffer is scanned to determine if the successive message number exists, that is, is the new message the predecessor of a previously received message block 80. If the successive message number exists, block 82 is executed, wherein the "predecessor exists" flag is set for the successor. The subroutine is then exited, block 84, and returns to mechanism 50.

Figure 4B:
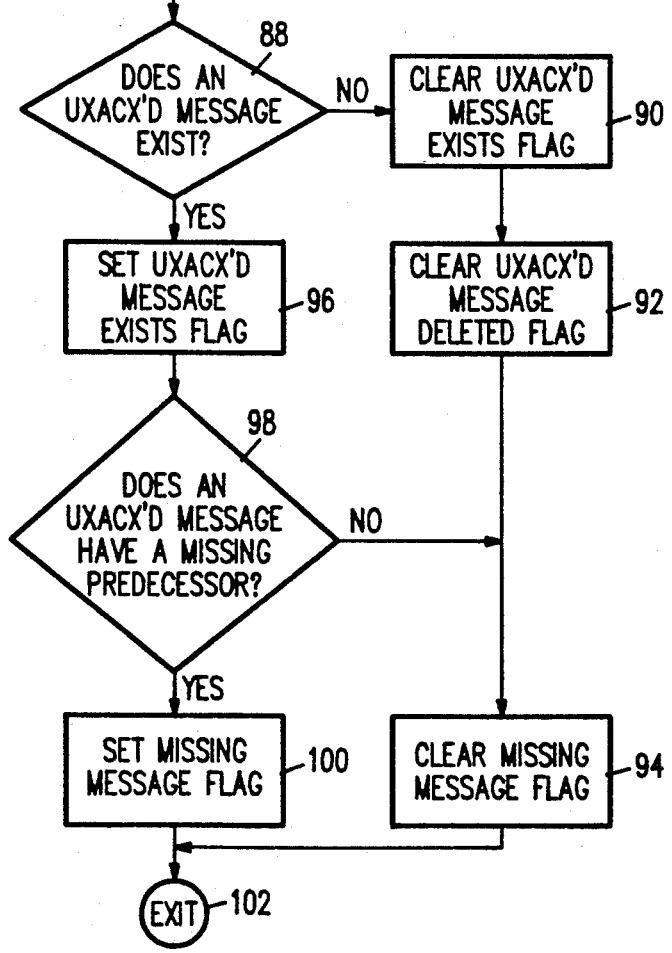

The next step is to execute the subroutine for updating the icon display flags, block 86, which is depicted in greater detail in FIG. 4b. This subroutine is referred to herein as icon means which indicates a message condition to the subscriber. Initially, subroutine 86 checks for the existence of an unacknowledged message flag, block 88, as set by block 72. If an unacknowledged message does not exist, block 90 is executed, and the "unacknowledged message exists" flag is cleared. Next, block 92 is executed, and an "unacknowledged message deleted" flag is cleared. Next, block 94 is executed, which clears the missing message flag which will result in icon 42 being cleared from display 32. If, however, an unacknowledged message does exist, block 96 is executed, and an "unacknowledged message exist" flag is set. The subroutine next asks whether the unacknowledged message has a missing predecessor, block 98. If the answer is "no", block 94 is executed. If the unacknowledged message does have a missing predecessor, block 100 is executed, and a "missing message" flag is set. The subroutine is then exited, block 102. Icon means displays a predetermined icon form, the envelope form 42 in two different displays, depending on whether 1) unacknowledged message(s) is/are sequentially stored in message buffer 54, in which case a steady state, first icon envelope form is displayed, or 2) an unacknowledged message has been deleted or there are non-sequential messages stored in buffer 54 as a result of a message having been missed, in which case a second, blinking icon envelope form is displayed. Different icon symbols may of course be displayed to indicate the various message states. Icon 42 will be displayed in a steady state if and only if the last received message is the last message in a sequential string of received and stored messages and only if no un-acknowledged messages have been deleted from buffer 54.

In normal operation, display screen 32 displays the date and time in conventional digital fashion. Analog-like displays may also be provided. The reception of a message triggers the mechanism previously described and results in the display of icon 42, presumably in a steady state, indicating that there is a message that has not been acknowledged. Wrist watch 10 is equipped with an audible alarm which may be set if the subscriber desires. Upon either hearing the audible alarm, or noticing that icon 42 is displayed, message button 36 may be depressed, resulting in a message, such as a CALL HOME message, as shown in FIG. 1. Other forms of messages may be displayed, such as other standard messages, such as CALL OFFICE, a message giving a telephone number that is to be called, or certain coded messages which are predetermined by the subscriber and are triggered by selected persons to whom the subscriber provides the codes.

If there is only one message in buffer 54, icon 42 is cleared once the message is acknowledged. As used herein, means for acknowledging receipt of a message includes button 36 and portions of icon mechanism 50 which control the display of icon 42.

Figure 2:
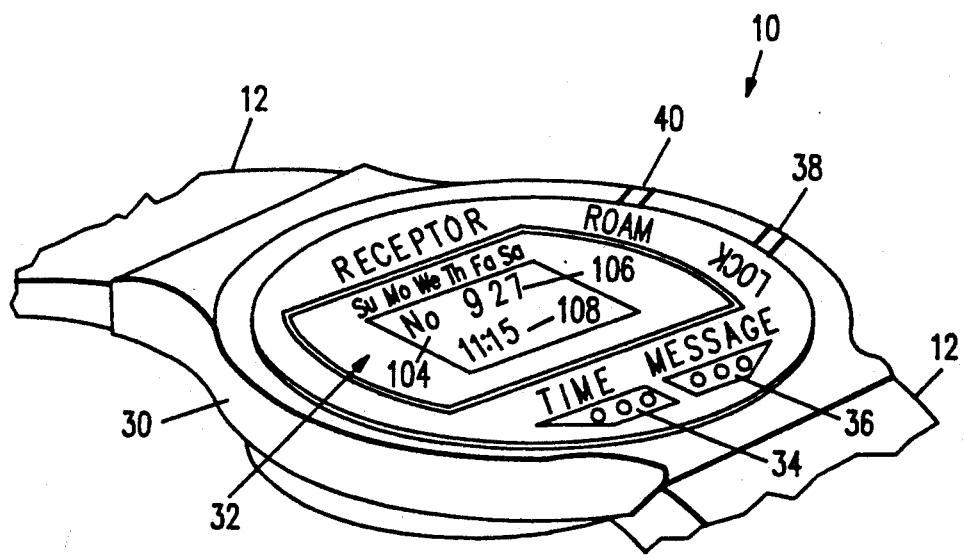
FIG. 2 is a perspective view the receiver of FIG. 1 having message received information displayed thereon.

Assuming that a number of messages have been received and stored in buffer 54, the messages may be reviewed, in the preferred embodiment, from the newest to the oldest, by pressing and releasing message button 36 to display the newest message. If message button 36 is then pressed and held, a display such as that shown in FIG. 2 will appear, which includes a message number 104, which shows that the particular message is number 9, the date that the message was received, 106, the 27th and the time 108 at which the message was received, which is depicted as 11:15. This also causes the message to become acknowledged. Continuing to press message button 36 and then press and hold button 36 will scroll through the stored messages. The result is that all messages are acknowledged by this process.

The term "missing message" is herein used to indicate that there is a missing message immediately preceding an unacknowledged message, (that is, a break in the sequence of message numbers immediately preceding an unacknowledged message).

In the event that before a particular message is acknowledged more messages are received than can be stored in buffer 54, icon 42 will be displayed in a flashing state, indicating that an unacknowledged message has been deleted. The same display is used to indicate that there is a missing message in the sequence of those messages stored in buffer 24. In either the case of an unacknowledged deleted message, or a missing message, the message buffer may be scrolled through to determine the lowest message number contained therein or to determine the message number of a missing message. In the case of an unacknowledged deleted message, the lowest message number in the buffer is a successor to any deleted message, and, the subscriber may call the clearing house, and through predetermined coding on touch-tone phones, or through conventional voice communication, request that the unacknowledged, deleted messages be rebroadcast. In the preferred embodiment of the system, such rebroadcast is possible for up to 48 hours following initial transmission of the message.

It is noted that the routine shown in FIG. 4B is executed each time a message is acknowledged. The routine shown in FIG. 4B is also executed whenever a new message is received. Thus the routine in FIG. 4B is executed (1) whenever a new message is received and whenever a message is acknowledged.

In the case of a message which is missing from the sequence, a break in the displayed message numbers will occur as the subscriber scrolls through the message buffer. The scrolling feature comprises means for determining a missing message number. A retransmission of a particular missing message may be request for up to 48 hours following initial broadcast of the message. The icon mechanism therefore provides a means for a subscriber to selectively display received message numbers to provide information as to which messages were missed.

It should be appreciated that a message may be received out of sequence. If, for instance message number "4" is received and stored, followed by receipt of message number "6", icon 42 will be displayed in a blinking state. If message number "5" is subsequently received, the blinking icon will be replaced with a steady state icon. While it is not relevant to the present invention, if desired circuitry can be provided to maintain the icon in a blinking state until various other steady state conditions are met.

Although a preferred embodiment of the mechanism and the method for alerting a subscriber have been described herein, it should be appreciated that further variations and modifications made thereto without departing from the scope of the invention as defined in the appended claims.

What we claim is:

1. In a radio paging system where a data stream is transmitted from a transmitting system to a plurality of radio paging receivers, each of said radio paging receivers having associated therewith a unique identification indicia, said data stream including messages for a plurality of said radio paging receivers, each of said messages being intended for a particular one of said receivers, each of said messages including text and a unique identification indicia indicating the particular receiver for which said messages is intended, said system including,
   numbering means in said transmitting system for sequentially assigning message numbering to the messages intended for each particular receiver and for transmitting said numbers with the associated messages in said data stream, whereby said data stream includes messages for a plurality of receivers, and sequential messages in said data stream do not have sequential numbers,
   control means in a particular one of said radio paging receivers including:
   message signal generating means for generating a message-received signal upon receipt of a message which includes the identification indicia of said particular paging receiver;
   message storage means for storing received messages which include the identification indicia of said particular paging receiver, said message storage means storing the text and message number of messages that are stored;
   interrogation means for comparing the message numbers and text of sequentially received messages and for generating a missing message signal if the compared message numbers are not sequential; and
   icon means for indicating a message condition wherein said icon means displays a predetermined first icon form upon receipt of a message received signal and displays a second icon form upon receipt of said missing message signal.

2. The icon mechanism of claim 1 which further includes message non-duplicating means for comparing a message number with a previously received message number which is stored in said message storage means and comparing the newly received message text with the stored message text associated with the previous message number, and which discards a newly received data stream if both the message number and the message text are identical.

3. The icon mechanism of claim 1 wherein said predetermined icon form and said other icon form are the same symbol, and wherein said predetermined icon form is the symbol displayed in a steady state and said other icon form is said symbol displayed in an alternating off-and-on state.

4. The icon mechanism of claim 3 which includes means for selectively indicating a missing message number when said second icon form is displayed.

5. The icon mechanism of claim 3 which includes means for acknowledging receipt of a message by the user.

6. The icon mechanism of claim 5 wherein said means for acknowledging includes means for clearing said predetermined icon form and said other icon form when all transmitted messages have been received and acknowledged.

7. In a radio paging system where a data stream is transmitted from a transmitting system to a plurality of radio paging receivers, each of said radio paging receivers having associated therewith a unique identification indicia, said data stream including messages for a plurality of said radio paging receivers, each of said messages being intended for a particular one of said receivers, each of said messages including text and a unique identification indicia indicating the particular receiver for which said message is intended, said system including,
   numbering means in said transmitting system for sequentially assigning message numbers to the messages intended for each particular receiver and transmitting said numbers with the associated messages in said data stream, whereby, sequential messages in said data stream do not have sequential numbers,
   control means in a particular one of said radio paging receivers including:
   message non-duplicating means for comparing the message number and text of a newly received message which includes the identification indicia of said particular paging receiver with the message number and text of the previous sequentially received message and for generating a message received signal if the text and message number of said messages are not the same;
   interrogation means for comparing the message numbers of sequentially received messages and generating a missing message signal if the compared message numbers are not sequential; and
   icon means for indicating a message condition wherein said icon means displays a first icon form upon receipt of a message received signal and displays a second icon form upon receipt of a messing message signal.

8. The icon mechanism of claim 7 wherein said message non-duplicating means includes means for comparing a message number with a previous message number and comparing the message text with the message text associated with the previous message number.

9. The icon mechanism of claim 8 which includes a message buffer for storing received message data and message number data for delayed acknowledgement by a user and for comparison with later received message signals.

10. The icon mechanism of claim 7 wherein said first icon form and said second icon form are the same symbol, and wherein said first icon form is the symbol displayed in a steady state and said second icon form is said symbol displayed in an alternating off-and-on state.

11. The icon mechanism of claim 7 which includes means for acknowledging receipt of a message by the user.

12. The icon mechanism of claim 11 wherein said means for acknowledging includes means for clearing said icon form when all transmitted messages have been received and acknowledged.

* * * * *